(12) United States Patent
Song et al.

(10) Patent No.: US 11,052,349 B2
(45) Date of Patent: Jul. 6, 2021

(54) APPARATUS FOR MEMBRANE DISTILLATION USING SOLAR ABSORBER AND HEAT PUMP

(71) Applicant: KOREA INSTITUTE OF SCIENCE AND TECHNOLOGY, Seoul (KR)

(72) Inventors: Kyung Guen Song, Seoul (KR); Won Jun Choi, Seoul (KR); Jae Won Shin, Seoul (KR); Jin-soo Cho, Seoul (KR); Dasom Wang, Seoul (KR)

(73) Assignee: KOREA INSTITUTE OF SCIENCE AND TECHNOLOGY, Seoul (KR)

(*) Notice: Subject to any disclaimer, the term of this patent is extended or adjusted under 35 U.S.C. 154(b) by 0 days.

(21) Appl. No.: 16/695,185

(22) Filed: Nov. 26, 2019

(65) Prior Publication Data

US 2021/0077952 A1    Mar. 18, 2021

(30) Foreign Application Priority Data

Sep. 16, 2019    (KR) .................. 10-2019-0113586

(51) Int. Cl.
*B01D 61/36*    (2006.01)
*B01D 3/00*    (2006.01)
(Continued)

(52) U.S. Cl.
CPC ......... *B01D 61/364* (2013.01); *B01D 1/0035* (2013.01); *B01D 3/007* (2013.01);
(Continued)

(58) Field of Classification Search
CPC ............... B01D 61/364; B01D 1/0035; B01D 2313/36; B01D 2313/38; C02F 1/14; C02F 1/447; Y02E 10/40
See application file for complete search history.

(56) References Cited

U.S. PATENT DOCUMENTS 4,194,949 A * 3/1980 Stark ..................... F24S 23/30
                                                    202/180
4,508,101 A * 4/1985 Carter .................... F28D 20/02
                                                    126/618
(Continued)

FOREIGN PATENT DOCUMENTS

CN    105749752 A * 3/2016 ............. B01D 61/36
CN    105749752 A    7/2016
(Continued)

OTHER PUBLICATIONS

Espacenet Translation of CN 105749752A obtained Nov. 19, 2020. (Year: 2020).*
(Continued)

*Primary Examiner* — Jonathan Miller
(74) *Attorney, Agent, or Firm* — Cantor Colburn LLP

(57) ABSTRACT

The present disclosure to an apparatus for membrane distillation using a solar absorber and a heat pump, in which in the implementation of a membrane distillation process for producing treated water using a temperature difference between raw water and a coolant, raw water is heated using the solar absorber with improved heat collection efficiency, and through this, the treated water production efficiency of the membrane distillation process is improved.

17 Claims, 5 Drawing Sheets

(51) Int. Cl.
  *B01D 1/00* (2006.01)
  *C02F 1/44* (2006.01)
  *C02F 1/14* (2006.01)

(52) U.S. Cl.
  CPC ............ *C02F 1/14* (2013.01); *C02F 1/447* (2013.01); *B01D 2313/36* (2013.01); *B01D 2313/38* (2013.01); *Y02E 10/40* (2013.01)

(56) References Cited

U.S. PATENT DOCUMENTS

| | | | | |
|---|---|---|---|---|
| 5,102,550 | A * | 4/1992 | Pizzino | B01D 61/364 210/640 |
| 5,300,197 | A * | 4/1994 | Mitani | B01D 61/364 159/DIG. 27 |
| 6,587,263 | B1 * | 7/2003 | Iacovangelo | G02B 1/12 359/359 |
| 7,871,520 | B2 * | 1/2011 | Ma | B01D 3/06 210/640 |
| 8,029,671 | B2 * | 10/2011 | Cath | B01D 61/364 210/321.64 |
| 8,460,551 | B2 * | 6/2013 | Al-Arifi | C02F 1/04 210/640 |
| 8,470,179 | B2 * | 6/2013 | Al-Arifi | C02F 1/14 210/640 |
| 2008/0210219 | A1 * | 9/2008 | Bostrom | F24S 70/225 126/569 |
| 2010/0224476 | A1 * | 9/2010 | Cath | B01D 1/221 203/10 |
| 2011/0290725 | A1 * | 12/2011 | Al-Arifi | C02F 1/14 210/640 |
| 2013/0277199 | A1 | 10/2013 | Summers et al. | |
| 2014/0263060 | A1 * | 9/2014 | Summers | C02F 1/447 210/640 |
| 2015/0246828 | A1 | 9/2015 | Jeong et al. | |
| 2019/0184340 | A1 | 6/2019 | Jeong et al. | |

FOREIGN PATENT DOCUMENTS

| | | | |
|---|---|---|---|
| CN | 106582292 A | | 4/2017 |
| CN | 108622982 A | * | 10/2018 ............ B01D 56/02 |
| JP | 2011167597 A | | 9/2011 |
| KR | 20010104397 A | | 11/2001 |
| KR | 101184787 B1 | | 9/2012 |
| KR | 101444884 B1 | | 9/2014 |
| KR | 1020150012576 A | | 2/2015 |
| KR | 1020150012578 A | | 2/2015 |
| KR | 101519478 B1 | | 5/2015 |
| KR | 101564758 B1 | | 11/2015 |
| KR | 101679768 B1 | | 11/2016 |
| KR | 1020170123487 A | | 11/2017 |
| KR | 1020170129507 A | | 11/2017 |
| KR | 101965619 B1 | | 4/2019 |
| KR | 101982617 B1 | | 5/2019 |

OTHER PUBLICATIONS

Espacenet Translation of CN 108622982A obtained Nov. 19, 2020. (Year: 2020).*
Korean Notice of Allowance for KR Application No. 10-2019-0113586 dated Jan. 29, 2021.
Korean Office Action for KR Application No. 10-2019-0113586 dated Nov. 16, 2020.

* cited by examiner

APPARATUS FOR MEMBRANE DISTILLATION USING SOLAR ABSORBER AND HEAT PUMP

DESCRIPTION OF GOVERNMENT-FUNDED RESEARCH AND DEVELOPMENT

This research is made by Korean Institute of Science and Technology and funded by Korea Agency for Infrastructure Technology Advancement, Ministry of Land, Infrastructure and Transport of the Republic of Korea. Research project is Infrastructure technology promotion research (R&D), and project name is Development of membrane distillation water purification technology using multilayer thin film light-absorbing heat generating material for decentralized water supply (Project Serial Number: 1615010260).

CROSS-REFERENCE TO RELATED APPLICATION

This application claims priority to Korean Patent Application No. 10-2019-0113586, filed on Sep. 16, 2019, and all the benefits accruing therefrom under 35 U.S.C. § 119, the contents of which in its entirety are herein incorporated by reference.

BACKGROUND

1. Field

The present disclosure relates to an apparatus for membrane distillation using a solar absorber and a heat pump, and more particularly, to an apparatus for membrane distillation using a solar absorber and a heat pump, in which in the implementation of a membrane distillation process for producing treated water using a temperature difference between raw water and a coolant, raw water is heated using the solar absorber with improved heat collection efficiency, and through this, the treated water production efficiency of the membrane distillation process is improved.

2. Description of the Related Art

Membrane distillation (MD) is a process in which separation is driven by a phase change that occurs on the surface of a hydrophobic polymer separation membrane, allowing vapor to pass through micropores on the separation membrane surface to condense, and it is used in the desalination process for separating and removing nonvolatile materials or materials with relatively low volatility, or used to separate organic matters with high volatility in aqueous solutions.

As opposed to the existing process using heat such as multi-stage flash (MSF) and multi effect distillation (MED), membrane distillation does not need to heat water such as seawater and wastewater up to the boiling point, so a lower operating temperature contributes to the energy cost savings, and moreover, the use of a microfiltration membrane having a large pore size eliminates the need for a very high operating pressure like a reverse osmosis (RO) process. Additionally, the fouling problem raised in the existing water treatment process using membranes is not so serious, and many benefits allow it to be used in applications of seawater desalination, water purification and ultrapure water production.

When renewable energy or waste heat is used as a source of heat for membrane distillation, it is possible to greatly reduce energy costs, and thus membrane distillation using waste heat or solar heat have been studied, and methods using solar collectors as an alternative to a source of heat for membrane distillation have been mostly suggested.

There are patents for membrane distillation using solar collectors, for example, Korean Patent No. 1444884, Korean Patent Publication No. 2015-12576, Korean Patent Publication No. 2015-12578, U.S. Pat. No. 8,470,179 and US Patent Publication No. 2013-277199.

However, the existing solar collectors applied to membrane distillation have low heat collection efficiency and are very much affected by weather, and these disadvantages are factors that reduce the treatment efficiency of the membrane distillation process. Additionally, when the membrane distillation process is performed using solar heat, as it is closer to the sunset time, the membrane distillation efficiency is lower, and a fundamental solution to this problem has not yet been proposed.

RELATED LITERATURES

Patent Literatures (Patent Literature 1) Korean Patent No. 1444884
(Patent Literature 2) Korean Patent Publication No. 2015-12576
(Patent Literature 3) Korean Patent Publication No. 2015-12578
(Patent Literature 4) U.S. Pat. No. 8,470,179
(Patent Literature 5) US Patent Publication No. 2013-277199

SUMMARY

The present disclosure is designed to solve the above-described problem, and therefore the present disclosure is directed to providing an apparatus for membrane distillation using a solar absorber and a heat pump, in which in the implementation of a membrane distillation process for producing treated water using a temperature difference between raw water and a coolant, raw water is heated using the solar absorber with improved heat collection efficiency, and through this, the treated water production efficiency of the membrane distillation process is improved.

The present disclosure is further directed to providing an apparatus for membrane distillation using a solar absorber and a heat pump, which uniformly maintains the membrane distillation efficiency by inducing the heating of the raw water and the cooling of the coolant through the heat pump when a temperature difference between the raw water and the coolant is below a reference value after sunset.

The present disclosure is further directed to providing an apparatus for membrane distillation using a solar absorber and a heat pump, which prevents a sharp reduction in membrane distillation efficiency after sunset, by maintaining the temperature of the raw water for a predetermined time even when sunlight gets weaker after sunset, by the application of a phase change material having heat absorbing and storing properties to the raw water tank.

To achieve the above-described object, an apparatus for membrane distillation using a solar absorber and a heat pump according to the present disclosure includes a raw water circulation pipe that circulates raw water in a raw water tank, a solar heat absorbing device provided on one side of the raw water circulation pipe to heat the raw water in the raw water circulation pipe, a raw water tank that receives the raw water heated by the solar heat absorbing device through the raw water circulation pipe and supplies the raw water to a membrane distillation module, the membrane distillation module that produces treated water from the raw water through a membrane distillation process, a coolant tank that supplies a coolant to the membrane distillation module and collects the treated water produced by the membrane distillation module, and the heat pump that heats the raw water and cools down the coolant when a temperature difference between the raw water in the raw water tank and the coolant in the coolant tank is smaller than a reference value.

A raw water storage channel may be provided in part of the raw water circulation pipe, and the solar heat absorbing device may be provided on the raw water storage channel, and may include a metal plate provided on the raw water storage channel to transfer solar heat absorbed by the solar absorber to the raw water in the raw water storage channel, and the solar absorber provided on the metal plate to absorb the solar heat.

The heat pump may include a refrigerant circulation pipe formed of a closed loop where a refrigerant circulates, and disposed such that the refrigerant circulation pipe goes through a condenser and an evaporator, a compressor provided in a position of the refrigerant circulation pipe to compress the refrigerant, an expansion valve provided in a different position of the refrigerant circulation pipe to expand the refrigerant having passed through the condenser, the condenser in which a raw water-side pipe is disposed together with the refrigerant circulation pipe through which the refrigerant compressed at high temperature and high pressure passes, to heat the raw water by heat exchange between the refrigerant of high temperature and the raw water of relatively low temperature, and the evaporator in which a coolant-side pipe is disposed together with the refrigerant circulation pipe through which the refrigerant expanded by the expansion valve passes, to cool down the coolant by heat exchange between the expanded refrigerant of low temperature and the coolant of relatively high temperature, wherein the raw water-side pipe may extend from a position of the raw water tank, go through the condenser and be connected to a different position of the raw water tank, and the coolant-side pipe may extend from a position of the coolant tank, go through the evaporator and be connected to a different position of the coolant tank.

A first thermometer may be provided on one side of the raw water tank to measure the temperature of the raw water, a second thermometer may be provided on one side of the coolant tank to measure the temperature of the coolant, and a control means may be further provided to calculate a difference between the temperature of the raw water measured by the first thermometer and the temperature of the coolant measured by the second thermometer, and when the corresponding difference is smaller than a preset reference value, control the heat pump to operate.

The solar absorber may have a structure in which a Ti—$MgF_2$ double layer including a $MgF_2$ layer on a Ti layer is repeatedly stacked multiple times.

The membrane distillation module may have any one configuration of direct contact membrane distillation (DCMD), air gap membrane distillation (AGMD), vacuum membrane distillation (VMD) and sweep gas membrane distillation (SGMD).

A phase change material may be provided on one side of the raw water tank, and may absorb heat of the raw water and store the heat when the temperature of the raw water is equal to or higher than a melting point, and release the stored heat when the temperature of the raw water is lower than the melting point.

An inner wall may be provided at a location spaced apart from an inner surface of the raw water tank, the phase change material may be provided in a space between the inner surface and the inner wall, the phase change material provided between the inner surface and the inner wall may surround the raw water of the raw water tank, and the space between the inner surface and the inner wall may be spatially separated from a space in which the raw water of the raw water tank is provided.

In addition, an apparatus for membrane distillation using a solar absorber and a heat pump according to the present disclosure includes a raw water tank provided with a solar heat absorbing device to supply raw water heated by the solar heat absorbing device to a membrane distillation module, the membrane distillation module that produces treated water from the raw water through a membrane distillation process, a coolant tank that supplies a coolant to the membrane distillation module and collects the treated water produced by the membrane distillation module, and the heat pump that heats the raw water and cools down the coolant when a temperature difference between the raw water in the raw water tank and the coolant in the coolant tank is smaller than a reference value, wherein the solar heat absorbing device is provided on an upper surface or a side of the raw water tank.

The solar heat absorbing device may include a metal plate mounted on the upper surface or the side of the raw water tank to provide a seating space for the solar absorber and collect solar heat, and the solar absorber provided in a groove of the metal plate to absorb the collected solar heat. In addition, the metal plate may have the tapered groove at a center, and the solar absorber may be seated in the groove.

The apparatus for membrane distillation using a solar absorber and a heat pump according to the present disclosure has the following effects.

It is possible to improve the raw water heating effect by solar heat by the application of the solar absorber with high infrared absorption and the solar heat absorbing device including the same, and based on this, improve the treated water production efficiency of the membrane distillation process.

Additionally, when the membrane distillation process efficiency reduces with the decreasing temperature difference between the raw water and the coolant after sunset, a temperature difference between the raw water and the coolant can be maintained at a predetermined level or above by heating the raw water and cooling the coolant through the heat pump.

Along with this, the phase change material having the ability to store and release heat is provided on one side of the raw water tank to prevent a sudden drop in raw water temperature when sunlight gets weaker as sunshine environment changes after sunset, thereby increasing the duration of the membrane distillation process.

DETAILED DESCRIPTION

The present disclosure proposes technology for, in the implementation of a membrane distillation (MD) process, improving the treated water production efficiency of the membrane distillation process by heating raw water using a solar absorber and maintaining the temperature of the heated raw water for a predetermined time or more through a phase change material.

As mentioned previously in the section 'background', the membrane distillation process is a process that produces treated water from raw water by inducing a partial vapor pressure difference through a temperature difference between raw water and coolant, to cause vapor of the raw water to pass through a MD separation membrane.

To improve the treated water production efficiency of the membrane distillation process, a large temperature difference between raw water and coolant is required, and the membrane distillation process using solar heat requires an extended period of time during which a temperature difference between raw water and coolant is maintained.

In the membrane distillation process using solar heat, at noon, a temperature difference between raw water and coolant is greatest and the membrane distillation efficiency is maximum, and as it is closer to the sunset time in the afternoon, a temperature difference between raw water and coolant gradually reduces and the membrane distillation efficiency tends to reduce. Accordingly, to increase the efficiency of the membrane distillation process using solar heat, it is necessary to maximize a temperature difference between raw water and coolant and prolong the time during which the temperature difference between raw water and coolant is maintained to enable the membrane distillation process.

The present disclosure proposes technology that maximizes a temperature difference between raw water and coolant using a new solar absorber, and maintains the temperature difference between raw water and coolant at a predetermined level or above through a heat pump when the temperature difference between raw water and coolant reduces after sunset. Additionally, the present disclosure proposes technology that prolongs the time during which the temperature difference between raw water and coolant is maintained by applying a phase change material.

Hereinafter, an apparatus for membrane distillation using a solar absorber and a heat pump according to first and second embodiments of the present disclosure will be described in detail with reference to the accompanying drawings. The first embodiment is the heating of raw water using a solar heat absorbing device and a raw water circulation pipe in the use of a solar absorber, and the second embodiment is a combination of a raw water tank with a solar heat absorbing device. First, the first embodiment is described as below.

Figure 1:
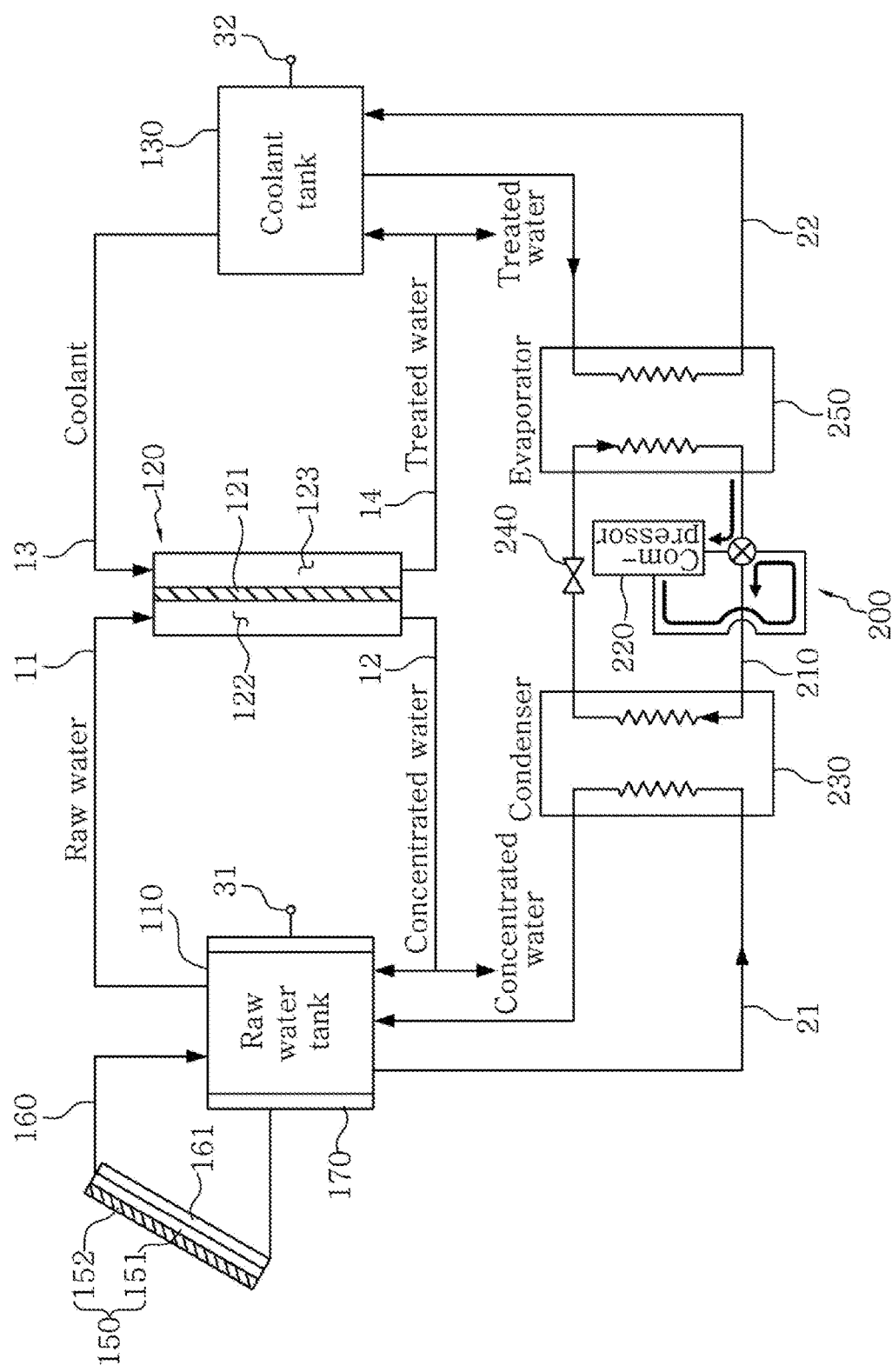
FIG. 1 is a configuration diagram of an apparatus for membrane distillation using a solar absorber and a heat pump according to a first embodiment of the present disclosure.

Referring to FIG. 1, the apparatus for membrane distillation using a solar absorber and a heat sink according to an embodiment of the present disclosure includes a raw water tank 110, a membrane distillation module 120, a coolant tank 130, a solar heat absorbing device 150, a raw water circulation pipe 160 and a heat pump 200.

The raw water tank 110 serves to store raw water to be treated and supply the raw water to the membrane distillation module 120, and the coolant tank 130 serves to supply a coolant to the membrane distillation module 120 and collect treated water produced by the membrane distillation module. The membrane distillation module 120 serves to produce treated water from the raw water by allowing vapor of the raw water to pass through a MD separation membrane 121 through a partial vapor pressure difference resulting from a temperature difference between the raw water and the coolant.

A raw water supply pipe 11 and a concentrated water pipe 12 are provided between the raw water tank 110 and the membrane distillation module, and a coolant supply pipe 13 and a treated water pipe 14 are provided between the coolant tank 130 and the membrane distillation module. The raw water in the raw water tank 110 is supplied to the membrane distillation module 120 through the raw water supply pipe 11, and raw water after separation of treated water, i.e., concentrated water moves to the raw water tank 110 through the concentrated water pipe 12. Additionally, the coolant in the coolant tank 130 is supplied to the membrane distillation module 120 through the coolant supply pipe 13, and treated water produced by the membrane distillation module 120, i.e., treated water separated from the raw water moves to the coolant tank 130 through the treated water pipe 14.

To enable the treated water production by the membrane distillation module 120, i.e., to enable the membrane distillation process by the membrane distillation module 120, the temperature of the raw water should be higher than the temperature of the coolant, and accordingly, it is necessary to heat the raw water above a predetermined temperature.

To heat the raw water, the solar heat absorbing device 150 and the raw water circulation pipe 160 are provided. In detail, as shown in FIG. 1, the raw water circulation pipe 160 where the raw water enters and exits is provided on one side of the raw water tank. The raw water circulation pipe 160 serves to supply the heated raw water to the raw water tank and circulate the cooled raw water in the raw water tank, and the raw water is heated by the solar heat absorbing device 150.

Two ends of the raw water circulation pipe 160 are each connected to the inlet side and the outlet side of the raw water tank, and the solar heat absorbing device 150 is provided in a position of the raw water circulation pipe 160. The solar heat absorbing device 150 is provided on a position of the raw water circulation pipe 160 to heat the raw water circulating along the raw water circulation pipe 160.

To increase the raw water heating effect by the solar heat absorbing device 150, a larger heat absorbing area is better, and to this end, a raw water storage channel 161 having a predetermined area may be provided in part of the raw water circulation pipe 160. With the raw water storage channel 161 having the predetermined area, the thermal contact time between the solar heat absorbing device 150 and the raw water increases, thereby effectively heating the raw water.

The solar heat absorbing device 150 provided on the raw water circulation pipe 160, to be exact, the solar heat absorbing device 150 provided on the raw water storage space of the raw water circulation pipe 160, has the following configuration.

The solar heat absorbing device 150 includes a metal plate 151 and a solar absorber 152.

The metal plate 151 serves to provide a mounting space for the solar absorber, and is provided on the raw water storage channel 161 to heat the raw water in the raw water storage channel 161 using the solar heat absorbed by the solar absorber. The metal plate 151 may be made of a metal having high thermal conductivity, for example, copper and aluminum.

The solar absorber is provided on the metal plate 151, and absorbs solar heat and transfers the absorbed solar heat to the raw water storage channel 161 through the metal plate 151, and the solar absorber has a structure in which a so-called Ti—$MgF_2$ double layer including a $MgF_2$ layer on a Ti layer is repeatedly stacked. The $MgF_2$ layer is a dielectric and has excellent infrared absorbing properties, and the Ti layer serves to transfer heat of infrared radiation absorbed by the $MgF_2$ layer. Because the solar absorber is formed by repeatedly stacking the Ti—$MgF_2$ double layer, it is possible to improve the absorption efficiency of solar infrared radiation, and through this, effectively heat the raw water in the raw water storage channel 161. In an embodiment, in the Ti—$MgF_2$ double layer, the Ti layer may be formed with the thickness of 10 nm, the $MgF_2$ layer may be formed with the thickness of 320 nm, and the solar absorber may be completed by repeatedly stacking the Ti—$MgF_2$ double layer 10 times.

The raw water in the raw water storage channel 161 heated through the solar heat absorbing device 150 is supplied to the raw water tank through the raw water circulation pipe 160, and accordingly, the membrane distillation process by a temperature difference between the raw water and the coolant can be smoothly performed.

To prevent the raw water in the raw water tank from being cooled down, as described above, the raw water circulation pipe 160 is also provided on the outlet side of the raw water tank, and the raw water going out of the outlet side of the raw water tank goes into the raw water storage channel 161 again and is re-heated by the solar heat absorbing device 150.

Meanwhile, because the raw water is heated by the solar heat absorbing device 150, as it is closer to the sunset time, sunlight gets weaker, and accordingly a temperature difference between the raw water and the coolant gradually reduces. That is, as it is closer to the sunset time, the temperature of the raw water in the raw water tank 110 is lower, and thus a temperature difference between the raw water and the coolant is smaller, which reduces the membrane distillation efficiency or makes it difficult to perform the membrane distillation process itself.

The heat pump 200 is provided to smoothly perform the membrane distillation process even at cloudy days or when sunlight gets weaker as it is closer to the sunset time. The heat pump 200 serves to heat the raw water in the raw water tank 110 and cool the coolant in the coolant tank 130. When a temperature difference between the raw water and the coolant is smaller than a preset reference value, the heat pump 200 operates to maintain a temperature difference between the raw water and the coolant at the reference value or above. For selective operation of the heat pump 200, a first thermometer 31 is provided on one side of the raw water tank 110 to measure the temperature of the raw water, a second thermometer 32 is provided on one side of the coolant tank to measure the temperature of the coolant, and a separate control means (not shown) is provided to calculate a difference between the temperature of the raw water measured by the first thermometer 31 and the temperature of the coolant measured by the second thermometer 32, and when the corresponding difference is smaller than the preset reference value, operate the heat pump 200. In more detail, when a temperature difference between the raw water and the coolant is smaller than the reference value, the control means may operate a compressor 220 of the heat pump 200.

The heat pump 200 includes a refrigerant circulation pipe 210, a compressor 220, a condenser 230, an expansion valve 240 and an evaporator 250. The refrigerant circulation pipe 210 is a pipe that circulates the refrigerant through the compressor 220, the condenser 230, the expansion valve 240 and the evaporator 250, and the compressor 220 serves to compress the refrigerant at high temperature and high pressure. The condenser 230 serves to heat the raw water by heat exchange between the refrigerant of high temperature and the raw water of relatively low temperature, the expansion valve 240 serves to expand the refrigerant having passed through the condenser 230, and the evaporator 250 serves to cool down the coolant by heat exchange between the expanded refrigerant of low temperature and the coolant of relatively high temperature.

In detail, the refrigerant circulation pipe 210 is a closed loop-type pipe where the refrigerant circulates, and is disposed such that it goes through the condenser 230 and the evaporator 250. Additionally, the compressor 220 and the expansion valve 240 are provided in a position of the refrigerant circulation pipe 210, and as described above, the compressor 220 serves to compress the refrigerant in the refrigerant circulation pipe 210 at high temperature and high pressure, and the expansion valve 240 expands the refrigerant having passed through the condenser 230.

The condenser 230 is where a raw water-side pipe 21 is disposed, together with the refrigerant circulation pipe 210 through which the refrigerant compressed at high temperature and high pressure passes. The raw water-side pipe 21 extends from a position of the raw water tank 110, goes through the condenser 230 and is connected to a different position of the raw water tank, and the raw water in the raw water tank 110 cooled down below a predetermined temperature is heated above the predetermined temperature while passing through the raw water-side pipe 21 disposed in the condenser 230.

The evaporator 250 is where a coolant-side pipe 22 is disposed, together with the refrigerant circulation pipe 210 through which the refrigerant expanded by the expansion valve 240 passes. The coolant-side pipe 22 extends from a position of the coolant tank 130, goes through the evaporator 250 and is connected to a different position of the coolant tank 130, and the coolant in the coolant tank raised above a predetermined temperature is cooled down below the predetermined temperature while passing through the coolant-side pipe 22 disposed in the evaporator 250.

Under this configuration, the temperature of the raw water measured by the first thermometer 31 and the temperature of the coolant measured by the second thermometer 32 are transmitted to the control means, and when a temperature difference between the raw water and the coolant is smaller than the preset reference value, the control means operates the compressor 220 to allow the raw water to be heated by the condenser 230 and the coolant to be cooled down by the evaporator 250.

Figure 5:
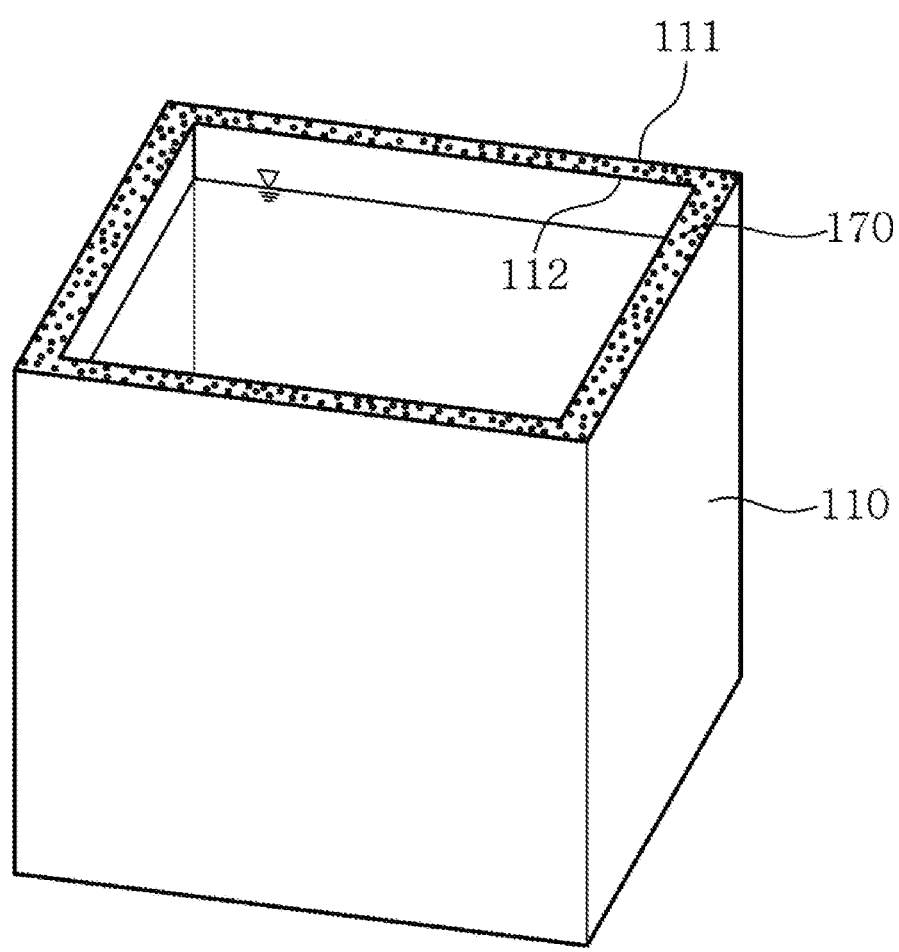
FIG. 5 is a configuration diagram of a raw water tank provided with a phase change material.

Hereinabove, the heating of the raw water by the solar absorber and the operation of the heat pump when a temperature difference between the raw water and the coolant reduces after sunset have been described. In addition to the above-described configuration, to prevent a sharp reduction in the temperature of the raw water in the raw water tank after sunset, as shown in FIG. 5, a phase change material (PCM) 170 may be additionally provided on one side of the raw water tank 110.

The phase change material is a material that changes in phase between solid and liquid, and the material is a solid below the melting point and a liquid above the melting point, and has properties that it absorbs and stores heat when it is in a liquid state at temperatures above the melting point and releases the stored heat at temperatures below the melting point. Accordingly, the surrounding environment can be maintained at a predetermined temperature or above through the phase change material.

When this is applied to the present disclosure, it is possible to prevent a sharp reduction in raw water temperature caused by a sunshine environment change, for example, sunset, through the phase change material, and ultimately, prolong the time during which a temperature difference between raw water and coolant is maintained through the phase change material, thereby increasing the duration and efficiency of the membrane distillation process.

In detail, the phase change material is provided in the raw water tank 110 according to the following configuration. The configuration in which the phase change material is provided in the raw water tank 110 is classified into two embodiments. In the first embodiment, as shown in FIG. 5, an inner wall 112 is provided at a location spaced apart from an inner surface 111 of the raw water tank 110, and the phase change material 170 is provided in a space between the inner surface 111 and the inner wall 112. The space between the inner surface 111 and the inner wall 112 is separated from a space in which the raw water of the raw water tank 110 is provided, and accordingly the phase change material 170 present between the inner surface 111 and the inner wall 112 does not leak to the space in which the raw water of the raw water tank 110 is provided. In this configuration, the phase change material 170 surrounds around the raw water tank 110. The phase change material 170 is provided such that it surrounds around the raw water tank 110 in which the raw water is stored, thereby effectively absorbing heat from the raw water and releasing heat into the raw water.

The phase change material 170 provided between the inner surface 111 and the inner wall 112 may be provided in the form of an emulsion or a capsule. That is, the phase change material may be dissolved in a fluid in the form of an emulsion, or the phase change material capsule may be dispersed in a fluid. Here, the phase change material capsule refers to a capsule as a result of encapsulating the phase change material.

In the second embodiment, the phase change material capsule may be directly fed into the raw water in the raw water tank 110. In this case, a baffle may be installed on the inlet and outlet side of the raw water tank 110 to prevent a loss of the phase change material capsule from the raw water tank 110.

The phase change material provided in the raw water tank 110 according to the above-described two embodiments should be optimized for the membrane distillation process. It is known that the melting point of the phase change material is between −10° C. and 60° C. according to materials. Considering that a coolant used in the membrane distillation process is water of the room temperature, the phase change material applied to the raw water tank 110 of the present disclosure may be a phase change material having the melting point of between 20° C. and 60° C. Additionally, the phase change material is classified into an organic PCM, an inorganic PCM and a eutectic PCM, and the phase change material having the melting point of between 20° C. and 60° C. may be applied to the raw water tank 110 of the present disclosure irrespective of classification.

Hereinabove, the entire configuration of the apparatus for membrane distillation using a solar absorber and a heat pump according to the first embodiment of the present disclosure has been described. The operation of the apparatus for membrane distillation using a solar absorber and a heat pump according to the first embodiment of the present disclosure having the above-described configuration, i.e., a method for membrane distillation is performed as below.

First, raw water to be treated is supplied and stored in the raw water tank 110. The raw water in the raw water tank 110 enters and exits the raw water circulation pipe 160, and the raw water is heated by the solar heat absorbing device 150 while circulating along the raw water circulation pipe 160. Additionally, when the phase change material 170 is provided on one side of the raw water tank 110, if the temperature of the raw water is equal to or higher than a predetermined temperature, the phase change material absorbs heat of the raw water and stores the heat.

In detail, under a structure in which the raw water storage channel 161 is provided in part of the raw water circulation pipe 160, and the solar heat absorbing device 150 including the metal plate 151 and the solar absorber is provided on the raw water storage channel 161, the raw water is heated by the solar heat collected by the solar heat absorbing device 150 while passing through the raw water storage channel 161, and the heated raw water is supplied to the raw water tank. Additionally, the cooled raw water in the raw water tank re-circulates along the raw water circulation pipe 160 and is re-heated by the solar heat absorbing device 150.

Figure 2:
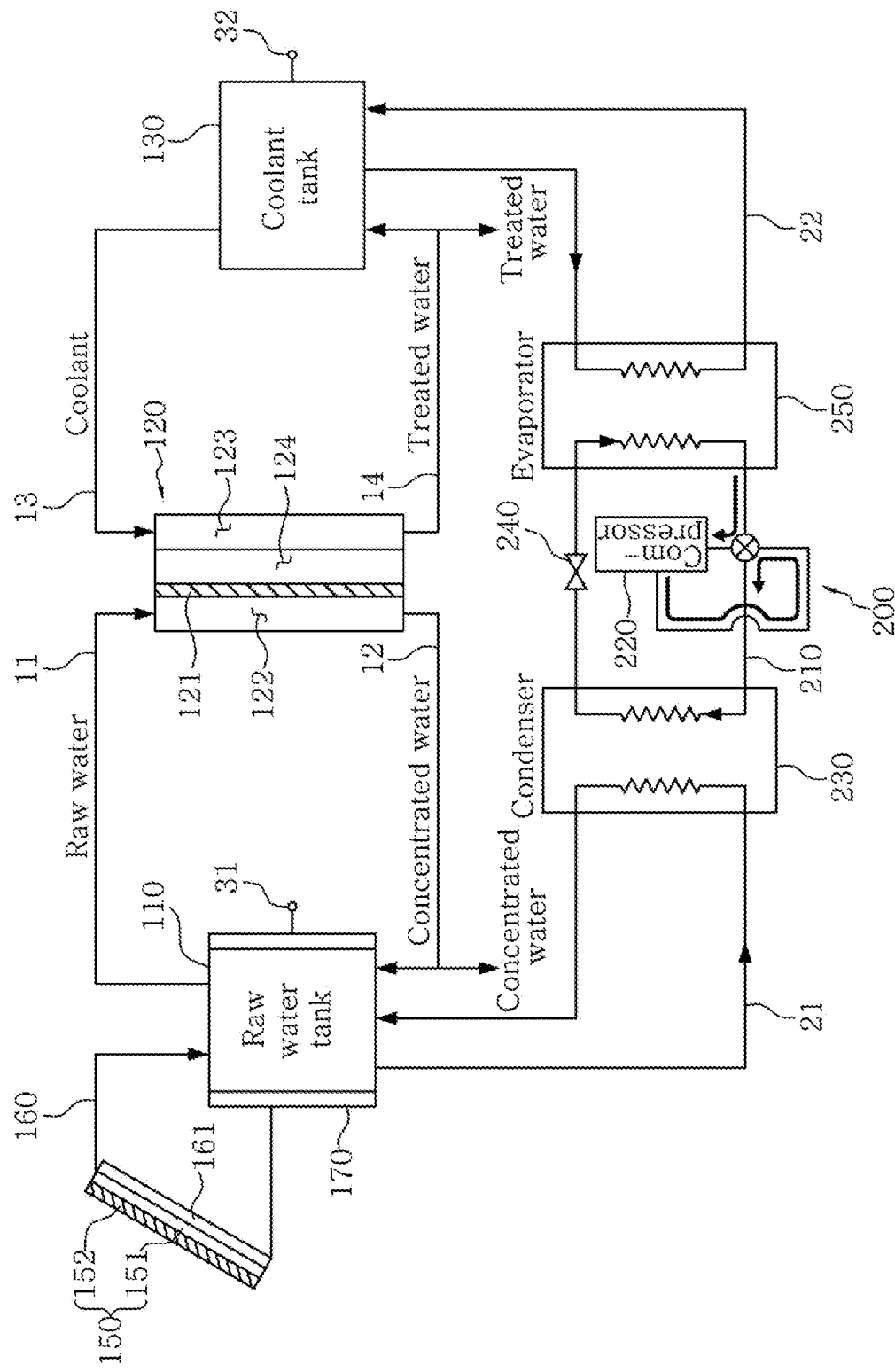
FIG. 2 is a configuration diagram of an apparatus for membrane distillation using a solar absorber and a heat pump according to a variation of a first embodiment of the present disclosure.

The raw water heated by the solar heat absorbing device 150 is supplied to the membrane distillation module 120. The membrane distillation module 120 may have direct contact membrane distillation (DCMD) in which the raw water and the coolant are in direct contact with the MD separation membrane 121, air gap membrane distillation (AGMD) (see FIG. 2) having an air gap (124 in FIG. 2) between the MD separation membrane 121 and the coolant, vacuum membrane distillation (VMD) or sweep gas membrane distillation (SGMD) configuration, and for convenience of description, the following description will be made based on a direct contact membrane distillation apparatus.

The raw water heated by the solar heat absorbing device 150, for example, the raw water of between 40° C. and 70° C., is supplied to a raw water channel 122 of the membrane distillation module 120 through the raw water supply pipe 11. At the same time, the coolant in the coolant tank 130 is supplied to a coolant channel 123 of the membrane distillation module 120. In this instance, the coolant may be adjusted to the room temperature of about 20° C. When the raw water and the coolant contact each other with the MD separation membrane 121 interposed between, the raw water evaporates due to a temperature difference between the raw water and the coolant, vapor moves to the coolant channel 123 through the MD separation membrane 121, and treated water having moved to the coolant channel 123 moves to the coolant tank 130 or a treated water tank through the treated water pipe 14. Additionally, raw water after separation of treated water, i.e., concentrated water moves to the raw water tank 110 through the concentrated water pipe 12.

While the raw water is heated by the solar heat absorbing device and the membrane distillation process is performed using the heated raw water as described above, the control means continuously measures the temperature of the raw water and the temperature of the coolant through the first thermometer 31 and the second thermometer 32 respectively, and when a difference in the measured temperature between the raw water and the coolant is smaller than a preset reference value, operates the heat pump 200 to heat the raw water and cool the coolant. Through the operation of the heat pump 200, a temperature difference between the raw water and the coolant may be maintained at a predetermined level or above, and the reference value may be arbitrarily set within the temperature range in which the membrane distillation process is possible.

Additionally, when the phase change material is provided on one side of the raw water tank, the phase change material absorbs heat of the raw water and stores the heat when the temperature of the raw water is equal to or higher than the melting point of the phase change material, and releases the stored heat when the temperature of the raw water is lower than the melting point of the phase change material. As the phase change material works in this way, it is possible to prevent a sudden drop in raw water temperature.

Hereinabove, the apparatus for membrane distillation using a solar absorber and a heat pump according to the first embodiment of the present disclosure and the method for membrane distillation using the same have been described. Next, an apparatus for membrane distillation using a solar absorber and a heat pump according to a second embodiment of the present disclosure and a method for membrane distillation using the same will be described below.

Figure 3:
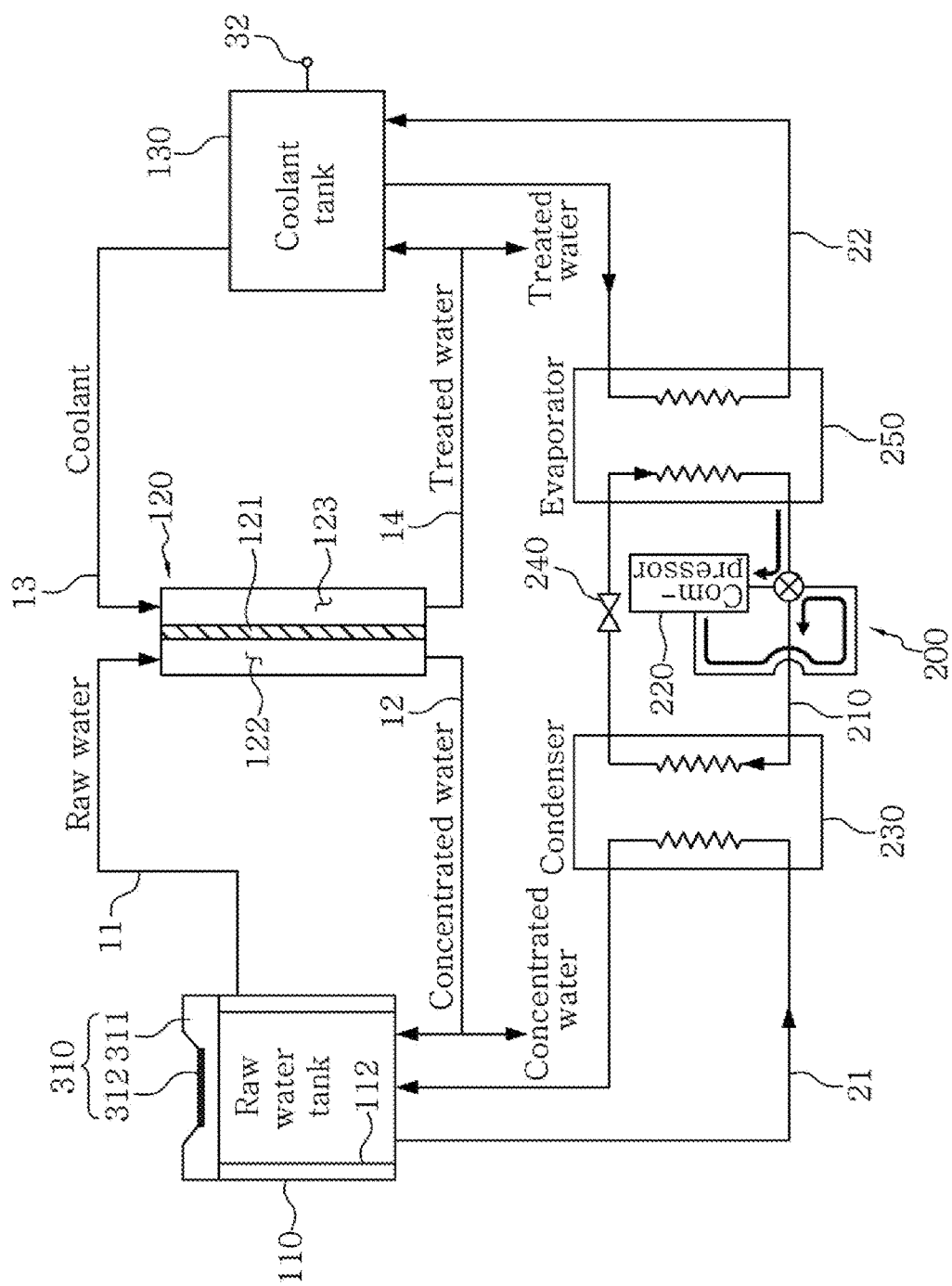
FIG. 3 is a configuration diagram of an apparatus for membrane distillation using a solar absorber and a heat pump according to a second embodiment of the present disclosure.

Referring to FIG. 3, the apparatus for membrane distillation using a solar absorber and a heat pump according to the second embodiment of the present disclosure includes a raw water tank 110, a membrane distillation module 120 and a coolant tank 130.

The raw water tank 110 serves to store raw water to be treated and supply the raw water to the membrane distillation module 120, and the coolant tank 130 serves to supply a coolant to the membrane distillation module and collect treated water produced by the membrane distillation module 120. The membrane distillation module 120 serves to produce treated water from the raw water by allowing vapor of the raw water to pass through a MD separation membrane 121 through a partial vapor pressure difference resulting from a temperature difference between the raw water and the coolant.

A raw water supply pipe 11 and a concentrated water pipe 12 are provided between the raw water tank 110 and the membrane distillation module 120, and a coolant supply pipe 13 and a treated water pipe 14 are provided between the coolant tank 130 and the membrane distillation module 120. The raw water in the raw water tank 110 is supplied to the membrane distillation module 120 through the raw water supply pipe 11, and raw water after separation of treated water, i.e., concentrated water moves to the raw water tank 110 through the concentrated water pipe 12. Additionally, the coolant in the coolant tank 130 is supplied to the membrane distillation module 120 through the coolant supply pipe 13, and treated water produced by the membrane distillation module 120, i.e., treated water separated from the raw water moves to the coolant tank 130 through the treated water pipe 14.

To enable the treated water production by the membrane distillation module 120, i.e., to enable the membrane distillation process by the membrane distillation module 120, the temperature of the raw water should be higher than the temperature of the coolant, and accordingly, it is necessary to heat the raw water above a predetermined temperature.

To heat the raw water, the raw water tank 110 is provided with a solar heat absorbing device 310. In detail, as shown in FIG. 3, the solar heat absorbing device 310 is provided on the upper surface of the raw water tank 110. The solar heat absorbing device 310 is configured to collect solar heat and heat the raw water tank 110, and includes a metal plate 311 and a solar absorber 313.

The metal plate 311 is mounted on the upper surface of the raw water tank 110 to provide a seating space for the solar absorber 313, and serves to collect solar heat and guide the collected solar heat to be absorbed by the solar absorber 313. Along with this, the metal plate 311 serves to transfer the solar heat absorbed by the solar absorber 313 to the raw water tank 110.

In addition to providing the seating space for the solar absorber 313, to collect solar heat, the metal plate 311 has a tapered groove 311a at the center, and the solar absorber 313 is seated in the groove 311a. The groove 311a formed at the center of the metal plate 311 has a tapered shape to effectively collect solar heat, and the collected solar heat is effectively absorbed by the solar absorber 313.

The metal plate 311 may be made of a metal having high thermal conductivity, for example, copper and aluminum, and to increase the heating effect of the raw water tank 110, the metal plate 311 may be disposed over the entire upper surface of the raw water tank 110.

The solar absorber 313 absorbs solar heat and transfers the absorbed solar heat to the raw water tank 110 through the metal plate 311, and the solar absorber 313 has a structure in which a so-called Ti—$MgF_2$ double layer including a $MgF_2$ layer on a Ti layer is repeatedly stacked. The $MgF_2$ layer is a dielectric and has excellent infrared absorbing properties, and the Ti layer serves to transfer heat of infrared radiation absorbed by the $MgF_2$ layer. As the solar absorber 313 is formed by repeatedly stacking the Ti—$MgF_2$ double layer, it is possible to improve the absorption efficiency of solar infrared radiation, and through this, effectively heat the raw water tank 110. In an embodiment, in the Ti—$MgF_2$ double layer, the Ti layer may be formed with the thickness of 10 nm and the $MgF_2$ layer may be formed with the thickness of 320 nm, and the solar absorber 313 may be completed by repeatedly stacking the Ti—$MgF_2$ double layer 10 times.

The solar heat absorbing device 310 as described above, i.e., the solar heat absorbing device 310 including the metal plate 311 and the solar absorber 313 may be mounted on the upper surface of the raw water tank 110 as well as the side of the raw water tank 110.

Through the solar heat absorbing device 310, it is possible to effectively heat the raw water in the raw water tank 110, and through this, induce a temperature difference between the raw water and the coolant, thereby enabling the membrane distillation process by the membrane distillation module.

Meanwhile, because the raw water is heated by the solar heat absorbing device 310, as it is closer to the sunset time, sunlight gets weaker, and accordingly a temperature difference between the raw water and the coolant gradually reduces. That is, as it is closer to the sunset time, the temperature of the raw water in the raw water tank 110 is lower, and thus a temperature difference between the raw water and the coolant reduces, which reduces the membrane distillation efficiency or makes it difficult to perform the membrane distillation process itself.

A heat pump 200 is provided to smoothly perform the membrane distillation process even at cloudy days or when sunlight gets weaker as it is closer to the sunset time. The heat pump 200 serves to heat the raw water in the raw water tank and cool the coolant in the coolant tank. When a temperature difference between the raw water and the coolant is smaller than a preset reference value, the heat pump 200 operates to maintain a temperature difference between the raw water and the coolant at the reference value or above. For selective operation of the heat pump 200, a first thermometer 31 may be provided on one side of the raw water tank to measure the temperature of the raw water, a second thermometer 32 may be provided on one side of the coolant tank to measure the temperature of the coolant, and a separate control means may be provided to calculate a difference between the temperature of the raw water measured by the first thermometer 31 and the temperature of the coolant measured by the second thermometer 32, and when the corresponding difference is smaller than the preset reference value, operate the heat pump 200. In more detail, when a temperature difference between the raw water and the coolant is smaller than the reference value, the control means may operate a compressor 220 of the heat pump 200.

The heat pump 200 includes a refrigerant circulation pipe 210, a compressor 220, a condenser 230, an expansion valve 240 and an evaporator 250. The refrigerant circulation pipe 210 is a pipe that circulates the refrigerant through the compressor 220, the condenser 230, the expansion valve 240 and the evaporator 250, and the compressor 220 serves to compress the refrigerant at high temperature and high pressure. The condenser 230 serves to heat the raw water by heat exchange between the refrigerant of high temperature and the raw water of relatively low temperature, the expansion valve 240 serves to expand the refrigerant having passed through the condenser 230, and the evaporator 250 serves to cool down the coolant by heat exchange between the expanded refrigerant of low temperature and the coolant of relatively high temperature.

In detail, the refrigerant circulation pipe 210 is a closed loop-type pipe where the refrigerant circulates, and is disposed such that it goes through the condenser 230 and the evaporator 250. Additionally, the compressor 220 and the expansion valve 240 are provided in a position of the refrigerant circulation pipe 210, and as described above, the compressor 220 serves to compress the refrigerant in the refrigerant circulation pipe 210 at high temperature and high pressure, and the expansion valve 240 expands the refrigerant having passed through the condenser 230.

The condenser 230 is where a raw water-side pipe 21 is disposed, together with the refrigerant circulation pipe 210 through which the refrigerant compressed at high temperature and high pressure passes. The raw water-side pipe 21 extends from a position of the raw water tank 110, goes through the condenser 230, and is connected to a different position of the raw water tank, and the raw water in the raw water tank cooled down below a predetermined temperature is heated above the predetermined temperature while passing through the raw water-side pipe 21 disposed in the condenser 230.

The evaporator 250 is where a coolant-side pipe 22 is disposed, together with the refrigerant circulation pipe 210 through which the refrigerant expanded by the expansion valve 240 passes. The coolant-side pipe 22 extends from a position of the coolant tank 130, goes through the evaporator 250 and is connected to a different position of the coolant tank 130, and the coolant in the coolant tank 130 raised above a predetermined temperature is cooled down below the predetermined temperature while passing through the coolant-side pipe 22 disposed in the evaporator 250.

Under this configuration, the temperature of the raw water measured by the first thermometer 31 and the temperature of the coolant measured by the second thermometer 32 are transmitted to the control means, and when a temperature difference between the raw water and the coolant is smaller than the preset reference value, the control means operates the compressor 220 to allow the raw water to be heated by the condenser 230 and the coolant to be cooled down by the evaporator.

Along with this, in the same way as the first embodiment, also in the second embodiment, a phase change material may be additionally provided. That is, in the same way as the first embodiment, the phase change material 170 may be provided on one side of the raw water tank 110 (see FIG. 5), and the configuration in which the phase change material is provided and the specific material of the phase change material may be designed in the same way as the first embodiment.

Hereinabove, the entire configuration of the apparatus for membrane distillation using a solar absorber and a heat sink according to the second embodiment of the present disclosure has been described. A method for membrane distillation using a solar absorber and a heat sink according to the second embodiment of the present disclosure is performed as below.

First, raw water to be treated is supplied and stored in the raw water tank 110. Under a structure in which the solar heat absorbing device 310 including the metal plate 311 and the solar absorber 313 is provided on the upper surface of the raw water tank 110, and the phase change material is provided between an inner surface 111 and an inner wall 112 of the raw water tank 110, the raw water in the raw water tank 110 is heated by solar heat collection, absorption and transfer by the solar heat absorbing device 310.

In detail, the tapered groove 311a provided in the metal plate 311 collects solar heat, the solar absorber 313 seated in the groove 311a absorbs the collected solar heat, and the solar heat absorbed by the solar absorber 313 is transferred to the raw water in the raw water tank 110 through the metal plate 311, so the raw water is heated by the solar heat.

Figure 4:
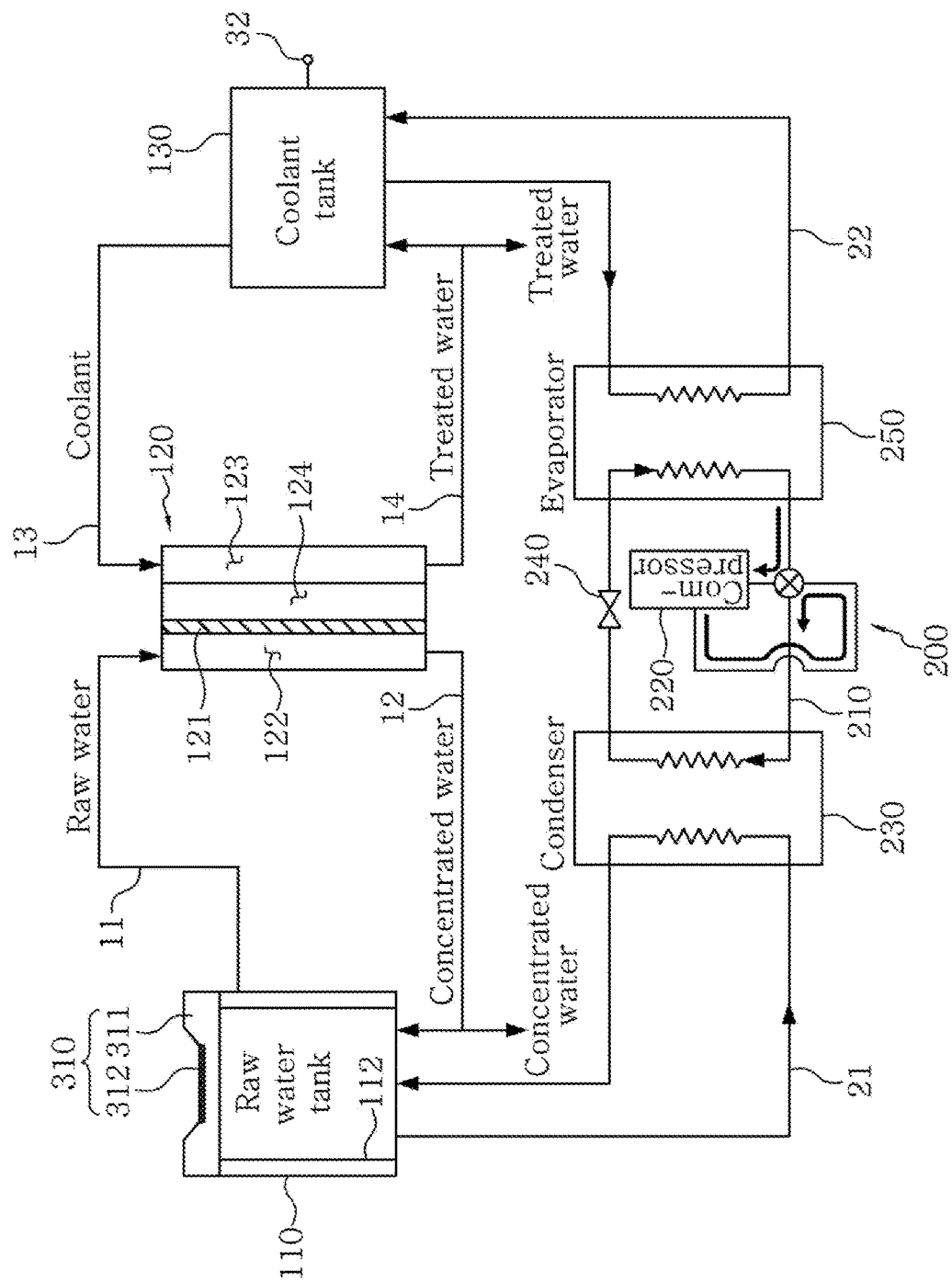
FIG. 4 is a configuration diagram of an apparatus for membrane distillation using a solar absorber and a heat pump according to a variation of a second embodiment of the present disclosure.

The raw water heated by the solar heat absorbing device 310 is supplied to the membrane distillation module 120. The membrane distillation module 120 may have direct contact membrane distillation (DCMD) in which raw water and coolant are in direct contact with the MD separation membrane 121, air gap membrane distillation (AGMD) (see FIG. 4) having an air gap (124 in FIG. 4) between the MD separation membrane 121 and the coolant, vacuum membrane distillation (VMD) or sweep gas membrane distillation (SGMD) configuration, and for convenience of description, the following description will be made based on a direct contact membrane distillation apparatus.

The raw water heated by the solar heat absorbing device 310, for example, the raw water of between 40° C. and 70° C., is supplied to a raw water channel 122 of the membrane distillation module 120 through the raw water supply pipe 11. At the same time, the coolant in the coolant tank 130 is supplied to a coolant channel 123 of the membrane distillation module 120. In this instance, the coolant may be adjusted to the room temperature of about 20° C. When the raw water and the coolant contact each other with the MD separation membrane 121 interposed between, the raw water evaporates due to a temperature difference between the raw water and the coolant, vapor moves to the coolant channel 123 through the MD separation membrane 121, and treated water having moved to the coolant channel 123 moves the coolant tank 130 or a treated water tank through the treated water pipe 14. Additionally, raw water after separation of treated water, i.e., concentrated water moves to the raw water tank 110 through the concentrated water pipe 12.

While the raw water is heated by the solar heat absorbing device and the membrane distillation process is performed using the heated raw water as described above, the control means continuously measures the temperature of the raw water and the temperature of the coolant through the first thermometer 31 and the second thermometer 32 respectively, and when a difference in the measured temperature between the raw water and the coolant is smaller than the preset reference value, operates the heat pump 200 to heat the raw water and cool the coolant. Through the operation of the heat pump 200, a temperature difference between the raw water and the coolant may be maintained at a predetermined level or above, and the reference value may be arbitrarily set within the temperature range in which the membrane distillation process is possible.

Additionally, when the phase change material is provided on one side of the raw water tank, the phase change material absorbs heat of the raw water and stores the heat when the temperature of the raw water is equal to or higher than the melting point of the phase change material, and releases the stored heat when the temperature of the raw water is lower than the melting point of the phase change material. As the phase change material works in this way, it is possible to prevent a sudden drop in raw water temperature.

[Detailed Description of Main Elements]

| | |
|---|---|
| 11: Raw water supply pipe | 12: Concentrated water pipe |
| 13: Coolant supply pipe | 14: Treated water pipe |
| 21: Raw water-side pipe | 22: Coolant-side pipe |
| 31: First thermometer | 32: Second thermometer |
| 110: Raw water tank | 111: Inner surface of raw water tank |
| 112: Inner wall of raw water tank | 120: Membrane distillation module |
| 121: MD separation membrane | 122: Raw water channel |
| 123: Coolant channel | 124: Air gap |
| 130: Coolant tank | 150: Solar heat absorbing device |
| 151: Metal plate | 152: Solar absorber |
| 160: Raw water circulation pipe | 161: Raw water storage channel |
| 170: Phase change material | |
| 200: Heat pump | 210: Refrigerant circulation pipe |
| 220: Compressor | 230: Condenser |
| 240: Expansion valve | 250: Evaporator |
| 310: Solar heat absorbing device | 311: Metal plate |
| 311a: Groove | 312: Solar absorber |

What is claimed is:

1. An apparatus for membrane distillation using a solar absorber and a heat pump, comprising:
    a raw water circulation pipe that circulates raw water in a raw water tank;
    a solar heat absorbing device provided on one side of the raw water circulation pipe to heat the raw water in the raw water circulation pipe;
    the raw water tank that receives the raw water heated by the solar heat absorbing device through the raw water circulation pipe and supplies the raw water to a membrane distillation module;
    the membrane distillation module that produces treated water from the raw water through a membrane distillation process;
    a coolant tank that supplies a coolant to the membrane distillation module and collects the treated water produced by the membrane distillation module; and
    the heat pump that heats the raw water and cools down the coolant when a temperature difference between the raw water in the raw water tank and the coolant in the coolant tank is smaller than a reference value.

2. The apparatus for membrane distillation using a solar absorber and a heat pump according to claim 1, wherein a raw water storage channel is provided in part of the raw water circulation pipe, and the solar heat absorbing device is provided on the raw water storage channel, and
    the solar heat absorbing device includes a metal plate provided on the raw water storage channel to transfer solar heat absorbed by the solar absorber to the raw water in the raw water storage channel, and the solar absorber provided on the metal plate to absorb the solar heat.

3. The apparatus for membrane distillation using a solar absorber and a heat pump according to claim 1, wherein the heat pump includes:
    a refrigerant circulation pipe formed of a closed loop where a refrigerant circulates, and disposed such that the refrigerant circulation pipe goes through a condenser and an evaporator,
    a compressor provided in a position of the refrigerant circulation pipe to compress the refrigerant,
    an expansion valve provided in a different position of the refrigerant circulation pipe to expand the refrigerant having passed through the condenser,
    the condenser in which a raw water-side pipe is disposed together with the refrigerant circulation pipe through which the refrigerant compressed at high temperature and high pressure passes, to heat the raw water by heat exchange between the refrigerant of high temperature and the raw water of relatively low temperature, and
    the evaporator in which a coolant-side pipe is disposed together with the refrigerant circulation pipe through which the refrigerant expanded by the expansion valve passes, to cool down the coolant by heat exchange between the expanded refrigerant of low temperature and the coolant of relatively high temperature,
    wherein the raw water-side pipe extends from a position of the raw water tank, goes through the condenser and is connected to a different position of the raw water tank, and the coolant-side pipe extends from a position of the coolant tank, goes through the evaporator and is connected to a different position of the coolant tank.

4. The apparatus for membrane distillation using a solar absorber and a heat pump according to claim 3, wherein a first thermometer is provided on one side of the raw water tank to measure the temperature of the raw water, and a second thermometer is provided on one side of the coolant tank to measure the temperature of the coolant, and
    a control means is further provided to calculate a difference between the temperature of the raw water measured by the first thermometer and the temperature of the coolant measured by the second thermometer, and when the corresponding difference is smaller than the reference value, control the heat pump to operate.

5. The apparatus for membrane distillation using a solar absorber and a heat pump according to claim 2, wherein the solar absorber has a structure in which a Ti-MgF$_2$ double layer including a MgF$_2$ layer on a Ti layer is repeatedly stacked multiple times.

6. The apparatus for membrane distillation using a solar absorber and a heat pump according to claim 1, wherein the membrane distillation module has any one configuration of direct contact membrane distillation (DCMD), air gap membrane distillation (AGMD), vacuum membrane distillation (VMD) and sweep gas membrane distillation (SGMD).

7. The apparatus for membrane distillation using a solar absorber and a heat pump according to claim 1, wherein a phase change material is provided on one side of the raw water tank, and
    the phase change material absorbs heat of the raw water and stores the heat when the temperature of the raw water is equal to or higher than a melting point, and releases the stored heat when the temperature of the raw water is lower than the melting point.

8. The apparatus for membrane distillation using a solar absorber and a heat pump according to claim 7, wherein an inner wall is provided at a location spaced apart from an inner surface of the raw water tank, and the phase change material is provided in a space between the inner surface and the inner wall, and
the phase change material provided between the inner surface and the inner wall surrounds the raw water of the raw water tank, and the space between the inner surface and the inner wall is spatially separated from a space in which the raw water of the raw water tank is provided.

9. An apparatus for membrane distillation using a solar absorber and a heat pump, comprising:
a raw water tank provided with a solar heat absorbing device to supply raw water heated by the solar heat absorbing device to a membrane distillation module;
the membrane distillation module that produces treated water from the raw water through a membrane distillation process;
a coolant tank that supplies a coolant to the membrane distillation module and collects the treated water produced by the membrane distillation module; and
the heat pump that heats the raw water and cools down the coolant when a temperature difference between the raw water in the raw water tank and the coolant in the coolant tank is smaller than a reference value,
wherein the solar heat absorbing device is provided on an upper surface or a side of the raw water tank.

10. The apparatus for membrane distillation using a solar absorber and a heat pump according to claim 9, wherein the solar heat absorbing device includes a metal plate mounted on the upper surface or the side of the raw water tank to provide a seating space for the solar absorber and to collect solar heat, and the solar absorber provided in a groove of the metal plate to absorb the collected solar heat.

11. The apparatus for membrane distillation using a solar absorber and a heat pump according to claim 9, wherein the heat pump includes:
a refrigerant circulation pipe formed of a closed loop where a refrigerant circulates, and disposed such that the refrigerant circulation pipe goes through a condenser and an evaporator,
a compressor provided in a position of the refrigerant circulation pipe to compress the refrigerant,
an expansion valve provided in a different position of the refrigerant circulation pipe to expand the refrigerant having passed through the condenser,
the condenser in which a raw water-side pipe is disposed together with the refrigerant circulation pipe through which the refrigerant compressed at high temperature and high pressure passes, to heat the raw water by heat exchange between the refrigerant of high temperature and the raw water of relatively low temperature, and
the evaporator in which a coolant-side pipe is disposed together with the refrigerant circulation pipe through which the refrigerant expanded by the expansion valve passes, to cool down the coolant by heat exchange between the expanded refrigerant of low temperature and the coolant of relatively high temperature,
wherein the raw water-side pipe extends from a position of the raw water tank, goes through the condenser and is connected to a different position of the raw water tank, and the coolant-side pipe extends from a position of the coolant tank, goes through the evaporator and is connected to a different position of the coolant tank.

12. The apparatus for membrane distillation using a solar absorber and a heat pump according to claim 11, wherein a first thermometer is provided on one side of the raw water tank to measure the temperature of the raw water, and a second thermometer is provided on one side of the coolant tank to measure the temperature of the coolant, and
a control means is further provided to calculate a difference between the temperature of the raw water measured by the first thermometer and the temperature of the coolant measured by the second thermometer, and when the corresponding difference is smaller than the reference value, control the heat pump to operate.

13. The apparatus for membrane distillation using a solar absorber and a heat pump according to claim 10, wherein the solar absorber has a structure in which a $Ti\text{-}MgF_2$ double layer including a $MgF_2$ layer on a Ti layer is repeatedly stacked multiple times.

14. The apparatus for membrane distillation using a solar absorber and a heat pump according to claim 10, wherein the groove of the metal plate is a tapered groove and defined at a center, and the solar absorber is seated in the tapered groove.

15. The apparatus for membrane distillation using a solar absorber and a heat pump according to claim 9, wherein the membrane distillation module has any one configuration of direct contact membrane distillation (DCMD), air gap membrane distillation (AGMD), vacuum membrane distillation (VMD), and sweep gas membrane distillation (SGMD).

16. The apparatus for membrane distillation using a solar absorber and a heat pump according to claim 9, wherein a phase change material is provided on one side of the raw water tank, and
the phase change material absorbs heat of the raw water and stores the heat when the temperature of the raw water is equal to or higher than a melting point, and releases the stored heat when the temperature of the raw water is lower than the melting point.

17. The apparatus for membrane distillation using a solar absorber and a heat pump according to claim 16, wherein an inner wall is provided at a location spaced from an inner surface of the raw water tank, and the phase change material is provided in a space between the inner surface and the inner wall, and
the phase change material provided between the inner surface and the inner wall surrounds the raw water of the raw water tank, and the space between the inner surface and the inner wall is spatially separated from a space in which the raw water of the raw water tank is provided.

* * * * *